US010519340B2

(12) United States Patent
Hohnholz et al.

(10) Patent No.: US 10,519,340 B2
(45) Date of Patent: Dec. 31, 2019

(54) TWO-COMPONENT COATING COMPOSITIONS AND COATINGS PRODUCED THEREFROM FOR IMPROVING EROSION RESISTANCE

(71) Applicant: BASF Coatings GmbH, Muenster (DE)

(72) Inventors: Dieter Hohnholz, Gross Ippener (DE); Dirk Seeger, Oldenburg (DE); Christoph Piecha, Stadland (DE)

(73) Assignee: BASF Coatings GmbH, Muenster (DE)

( * ) Notice: Subject to any disclaimer, the term of this patent is extended or adjusted under 35 U.S.C. 154(b) by 0 days.

(21) Appl. No.: 15/322,601

(22) PCT Filed: Apr. 28, 2015

(86) PCT No.: PCT/EP2015/059191
§ 371 (c)(1),
(2) Date: Dec. 28, 2016

(87) PCT Pub. No.: WO2016/000845
PCT Pub. Date: Jan. 7, 2016

(65) Prior Publication Data
US 2017/0152398 A1    Jun. 1, 2017

(30) Foreign Application Priority Data

Jul. 2, 2014 (EP) .................................... 14175353

(51) Int. Cl.
*C09D 175/12* (2006.01)
*C08G 18/66* (2006.01)
*C08G 18/72* (2006.01)
*B05D 3/00* (2006.01)
*C09D 5/00* (2006.01)

(52) U.S. Cl.
CPC ............ *C09D 175/12* (2013.01); *B05D 3/007* (2013.01); *C08G 18/6651* (2013.01); *C08G 18/721* (2013.01); *C09D 5/00* (2013.01)

(58) Field of Classification Search
CPC ........ C09D 175/12; C09D 5/00; B05D 3/007; C08G 18/6651; C08G 18/721
See application file for complete search history.

(56) References Cited

U.S. PATENT DOCUMENTS

| 4,160,853 | A  | * | 7/1979  | Ammons ............ B32B 17/1077 428/215 |
| 6,251,988 | B1 |   | 6/2001  | Blum et al. |
| 2005/0288431 | A1 |   | 12/2005 | Gindin et al. |
| 2009/0092811 | A1 | * | 4/2009  | Chasser ................ C08G 18/10 428/220 |
| 2011/0281998 | A1 | * | 11/2011 | Gindin ............... C08G 18/0828 524/537 |
| 2012/0004361 | A1 |   | 1/2012  | Watanabe et al. |
| 2013/0109804 | A1 | * | 5/2013  | Kusaka ............... C08F 290/067 524/590 |
| 2013/0210997 | A1 | * | 8/2013  | Kaune .................... C08G 18/12 524/590 |
| 2014/0356561 | A1 |   | 12/2014 | Ekin et al. |
| 2016/0024340 | A1 | * | 1/2016  | Rukavina ............. C08G 18/721 428/221 |

FOREIGN PATENT DOCUMENTS

| WO | WO 98/25986 A1 | 6/1998 |
| WO | WO 2007/031534 A1 | 3/2007 |
| WO | WO 2010/090186 A1 | 8/2010 |
| WO | WO 2010/122157 A1 | 10/2010 |
| WO | WO 2012/032113 A1 | 3/2012 |
| WO | WO 2013/006606 A2 | 1/2013 |

OTHER PUBLICATIONS

Bertleff, W., et al.; European Polyurethane Journal, Mar. 2008, p. 1-2.*
BASF Baxxodur® PC 136 product data sheet, 2018.*
Bayer MaterialScience; Products and Properties: Desmodur®/Desmophen® for Coatings, 2005, p. 1-28.*
International Search Report dated May 13, 2015 in PCT/EP2015/059191.

* cited by examiner

Primary Examiner — Robert S Jones
(74) Attorney, Agent, or Firm — Oblon, McClelland, Maier & Neustadt, L.L.P.

(57) ABSTRACT

The present invention relates to a two-component coating composition comprising (1) a paint base component comprising (A) at least one polycarbonate diol, (B) at least one diamine having secondary amino groups and having an aliphatic group (b1) between the nitrogen atoms of the amino groups, and also (2) a hardener component comprising (C) at least one polyisocyanate-modified polyester having an isocyanate content of 4% to 15%. The present invention also relates to a method for coating substrates by applying the coating composition, and to the use thereof.

17 Claims, No Drawings

TWO-COMPONENT COATING COMPOSITIONS AND COATINGS PRODUCED THEREFROM FOR IMPROVING EROSION RESISTANCE

The present invention relates to two-component coating compositions and to coatings produced from them. The present invention also relates to a method for producing these coatings, and to the use of the coating composition for producing coatings. The present invention relates not least to the use of the coating compositions for improving erosion resistance.

PRIOR ART

In various areas of application there is a requirement for coatings which satisfy exacting mechanical requirements. Examples here include surfaces of objects that in terms of the ambient conditions are exposed to high speeds in conjunction with exposure to erosive substances, such as solids or liquids. Erosive exposure is experienced in principle, therefore, by objects which, firstly, themselves are moved, and, secondly, by objects exposed to the influence of erosive substances. Particularly noteworthy are rotor blades of wind turbines or helicopters and ship's screws, air and land vehicles (such as aircraft, rail vehicles, automobiles, for example), and ships.

Fundamentally, erosion can be brought about by liquid or solid substances which are present themselves or dispersely or in solution in another gaseous or liquid medium (for example, air or water) and which are moved by that medium (for example, airborne sand, rain and/or hail). When these substances impinge on objects or their surfaces, they exert an erosive force on them. Examples of this are the erosion due to rain or airborne sand on rotor blades or in the region of the slats on aircraft. The erosive influences are particularly strong in the region of edges of the objects in question.

In general terms the possibility exists of controlling wear protection, more particularly the erosion resistance, of objects by means of coatings on the surfaces of the objects. Important factors in obtaining effective erosion resistance are known to include a closely matched balance between flexibility or elasticity of the coating, on the one hand, and the hardness of the coating, on the other. Excessive hardness and/or inadequate elasticity tend to be detrimental to effective erosion resistance.

One possibility for increasing erosion resistance is to increase the film thickness of coatings. In many applications, however, such as in aircraft construction or rotor blade construction of wind turbines, for example, this is undesirable, for reasons of weight.

Furthermore, resins with aromatic resin constituents, such as epoxy resins, for example, can be used in the coating compositions on which the coatings are based. On account of the aromatic moieties, however, the resulting coatings, while affording high wear resistance, possess a significantly restricted UV stability.

It is possible, furthermore, to use coating compositions comprising resins with which, induced by light or by temperature, high crosslinking densities can be achieved. For example, UV resins (via radical or ionic polymerization) or certain highly reactive polyaddition resins can be used. With these classes of binder it is likewise possible to enhance the wear resistance, but there are limiting factors governing use on large components such as rotor blades or aircraft components. In the case of formulations comprising UV resins, for example, the selection of pigments is limited, since these pigments may have absorption maxima at curing wavelengths, and the film thicknesses are limited in dependence on the level of pigmentation. Moreover, technical challenges arise in terms of oxygen inhibition of the UV initiators. In the case where temperature-induced coating materials (that is, in particular, common one-component paints) are used, a limitation exists in particular with regard to the baking temperatures in relation to equipment sizing in the case of large components.

International patent application WO 2010/122157 discloses erosion-resistant polyurethane coatings which are produced using aliphatic polyester polyols and an isocyanate component, as for example polylactone-modified isocyanate prepolymers or uretdione compounds.

WO 2012/032113 A1 discloses two-component, erosion-resistant coating compositions based on a polyol component and on a polylactone component terminated by isocyanate groups, these compositions being useful in the production of coatings on rotor blades.

Although the coatings produced accordingly have erosion resistance which is already improved, further improvement is desirable particularly in view of current challenges in, for example, the construction of wind turbine rotor blades, especially for wind-rich sites (offshore) and high blade speeds during operation, and also in aircraft construction (weight reduction with equal or improved performance).

PROBLEM

The problem addressed by the present invention, therefore, was that of eliminating the above-described disadvantages of the prior art. The intention was to provide coating compositions which can be used for producing erosion-resistant coatings, which exhibit a significantly enhanced erosion resistance compared with erosion-resistant coatings of the prior art. These coating compositions ought to be easy to produce and easy to use even with large components such as rotor blades of wind turbines or aircraft—that is, should be amenable to processing to coatings in particular without the use of UV initiators and/or of high temperatures.

SOLUTION

Found accordingly has been a two-component coating composition comprising
(1) a paint base component comprising
(A) at least one polycarbonate diol,
(B) at least one diamine comprising secondary amino groups and having an aliphatic group (b1) between the nitrogen atoms of the amino groups, and
(2) a hardener component comprising
(C) at least one polyisocyanate-modified polyester having an isocyanate content of 4% to 15%.

The new two-component coating composition is subject matter of the present invention and is also referred to below as coating composition of the invention. Preferred embodiments will become apparent from the description hereinafter and from the dependent claims.

The present invention also provides a method for producing coatings using the coating composition of the invention, and a coating produced from the coating composition. The invention also provides the use of the coating composition for improving erosion resistance.

The coating composition of the invention is easily processed to coatings. The coatings produced feature, in particular, excellent erosion resistance. The coating composition and the coatings are therefore ideally suited to substrates which are subject to severe erosive influences, examples being rotor blades or substrates in aircraft construction.

DESCRIPTION OF THE INVENTION

The coating composition of the invention is a two-component coating composition. This means, as is known, that for the purposes of the present invention, component (1) as described below (paint base component), and component (2) as described below (hardener component), are prepared and stored separately from one another and are not combined until shortly before application. The processing time or pot life (in other words, the time within which the coating composition of the invention can be processed at room temperature (15 to 25° C., more particularly 20° C.) without the increase in viscosity, as a result of corresponding crosslinking reactions at room temperature, for example, being so severe that application is no longer possible) is dependent, as is known, on the constituents employed, more particularly on the polycarbonate diols (A), diamines (B), described later on below, and on the polyisocyanate-modified polyester (C). In particular, however, the processing time of the coating composition is at least 0.1 min up to 10 min, preferably at least 0.5 min up to 5 min. The principal advantage of a two-component coating composition of this kind is that even in the case of large components such as rotor blades of wind turbines or aircraft, easy processing is possible—more particularly, no high temperatures are needed for curing. Following application to a substrate, the coating material of the invention is cured preferably at not more than 80° C., preferably not more than 60° C., especially preferably at from 15 to 60° C.

By curing is meant the process known to the skilled person, in other words the conversion of a coating composition, applied as a film to a substrate, into the ready-to-use state, in other words, therefore, into a state in which the substrate provided with the coating in question can be transported, stored, and put to its intended use. This curing is accomplished more particularly by chemical reaction of reactive functional groups in the components present, which are present as binder constituents in the coating material. Particularly noteworthy, therefore, in the context of the present invention is the reaction of the hydroxyl groups of the polycarbonate (A) and also of the amino groups of the diamine (B) with the isocyanate groups of the polyisocyanate-modified polyester (C). As a result of these crosslinking reactions and of the parallel evaporation of any solvents present, a coating film is formed—that is, a cured coating layer (cured coating) is produced. Activation of the reactions is possible by means of thermal energy, although in the present case there is the above-described advantage of high temperatures not being necessary. The term "binder" or "binder constituent" refers herein, in accordance with the relevant DIN EN ISO 4618, to the nonvolatile fraction of a coating material, excluding pigments and fillers. Specific binder constituents are therefore in this sense, as well as components (A) and (B), component (C) as well (which may also be referred to as hardener, curing agent, or crosslinking agent), or else typical coatings additives, and also all other nonvolatile constituents, bar the pigments and fillers. For reasons not least of clarity, however, the term "binder" is used principally in relation to those components of the paint base component (1) that are primarily responsible for film forming—that is, more particularly, components (A) and (B). Component (C) is identified primarily, correspondingly, as the hardener or else crosslinking agent.

The two-component coating composition comprises at least one polycarbonate diol (A) in the paint base component (1).

Considered formally, polycarbonate diols are esterification products which may form through reaction of carbonic acid with polyols. In actual practice, as is known, the carbonate structures are introduced by means of phosgene or carbonic diesters under common reaction conditions. The reaction with diols, as for example with 3-methyl-1,5-pentanediol or 1,6-hexanediol, then gives the polycarbonate diols. Besides the carbonate functions joining the starting components, of course, such polycarbonate diols may also, proportionally, include further functional groups such as ester groups or ether groups, depending on the nature and amount of the starting compounds used. The polycarbonate diol is preferably a linear polycarbonate diol. The hydroxyl groups are preferably terminal, in other words arranged at both ends of the preferably linear polycarbonate diol (hydroxyl-terminated polycarbonate diol). Very preferably the compound is an aliphatic polycarbonate diol. The polycarbonate diol therefore preferably contains no aromatic groups, since these groups have a significantly restricted UV resistance.

The polycarbonate diols (A), more particularly the linear, aliphatic polycarbonate diols, preferably possess an OH number of 50 to 500 mg KOH/g, preferably 100 to 400 mg KOH/g, more particularly 150 to 250 mg KOH/g (measured in accordance with DIN 53240). Any reference in the context of the present invention to an official standard is of course to the version of the standard that is valid on the filing date or, if there is no valid version on that date, to the most recent valid version.

Since the polycarbonates (A) are diolic components, the OH number and the number-average molecular weight of the components are dependent on one another, and the stated OH number gives information on the number-average molecular weight. A high number-average molecular weight tends to be accompanied by a low OH number. The number-average molecular weight may vary widely and is situated in the range from, for example, 220 g/mol to 2250 g/mol (measured by means of GPC analysis with THF (+0.1% acetic acid) as eluent (1 ml/min) on a styrene-divinylbenzene column combination, calibration with polystyrene standards).

Suitable polycarbonate diols (A) are available, for example, in the product line Duranol™ Asahi Kasei), Desmophen® from Bayer MaterialScience AG (Leverkusen, Germany) or Eternacoll® (UBE).

The fraction of the polycarbonates (A) is situated preferably in the range from 10 to 90 wt %, more preferably 15 to 70 wt %, very preferably 20 to 50 wt %, based in each case on the total weight of the coating composition of the invention.

The two-component coating composition comprises in the paint base component (1) at least one diamine (B) having secondary amino groups and having an aliphatic group (b1) between the nitrogen atoms of the amino groups. In particular the addition of the diamine and the combination thereof with a polycarbonate diol (A) and also with a polyisocyanate-modified polyester (C), results in a coating composition which when used produces coatings having greatly enhanced erosion resistance.

Functional groups in the diamine necessarily include secondary amino groups. Accordingly, the diamine comprises exclusively secondary amino groups, specifically exactly two second amino groups.

Secondary amino groups possess, as is known, exactly one hydrogen radical on the nitrogen atom. Moreover, there are two corresponding organic radicals (or organic groups) $R_1$ and $R_2$ present, which are bonded via a carbon atom to the nitrogen. These organic radicals $R_1$ and $R_2$ may then ultimately be selected arbitrarily, provided the amine character is retained. Possible examples are alkyl groups, aryl groups, and alkenyl groups, which may also be substituted, meaning that in place of hydrogen bonded to carbon they may contain at these positions different further functional groups such as hydroxyl groups or nitrile groups. Not possible, as is known, would be an acyl group in alpha-position to the nitrogen atom, since in that case the species would be an amide and not an amine.

Present in the organic radicals $R_1$ and $R_2$ of a secondary amino group there may of course also be bridging heteroatoms or bridging groups containing heteroatoms, provided the amine character is preserved. Examples include ether bonds or ester bonds.

An organic radical $R_1$ or $R_2$ as described may naturally also be located between two nitrogen atoms of two amino groups. In a diamine then present, for example, this radical then represents an organic radical for both amino groups. This is the case, for example, for the radical (b1) in the diamine (B) for inventive use.

Located between the nitrogen atoms of the secondary amino groups in the diamine is an aliphatic group (b1).

Aliphatic compounds are, as is known, acyclic or cyclic, saturated or unsaturated carbon-hydrogen compounds, which are not aromatic, or contain no aromatic components at all. The term "aliphatic compound" therefore encompasses acyclic and cyclic aliphatics (cycloaliphatics) and is considered a corresponding generic term in the context of the present invention as well. The acyclic aliphatics may be linear or branched. Linear in this context means, as is known, that the compound in question has no branches with respect to the carbon chain, but instead that the carbon atoms are arranged exclusively in linear sequence in a chain. Branched or nonlinear therefore means, in the context of the present invention, that the respectively considered compound has branching in the carbon chain—in other words, in contrast to what is the case with the linear compounds, at least one carbon atom of the compound in question is a tertiary or quaternary carbon atom. Cyclic aliphatics or cycloaliphatics are those compounds in which at least some of the carbon atoms present in the molecule are linked in such a way as to form one or more rings. Besides the one or more rings, of course, there may be further acyclic linear or branched aliphatic groups present in a cycloaliphatic.

An aliphatic group (or an aliphatic radical—the terms group and radical are used equivalently) is consequently a group which meets the provisions specified above for the aliphatic compounds, but is only a part of a molecule. Hence the (evidently divalent) aliphatic group (b1) between the nitrogen atoms of the amino groups in the diamine (B) is obviously only part of the molecule as a whole. Additionally present are the nitrogen atoms and also the two other organic radicals of the two secondary amino groups.

Examples of aliphatic groups are linear, branched, or cyclic alkyl groups.

The aliphatic groups (b1) are preferably saturated. In that case they may be saturated acyclic or cyclic aliphatic groups. The aliphatic groups (b1) possess preferably 4 to 30 carbon atoms, more particularly 6 to 18 carbon atoms. Particularly preferred are cyclic aliphatic groups (b1), more particularly those having 6 to 18 carbon atoms. A very particularly preferred aliphatic radical (b1) has the following formula (I).

(I)

This radical may be introduced through the use of the corresponding primary diamine isophoronediamine in the case of a preparation of the diamine (B) as described below.

Attached to both nitrogen atoms of the diamine (B), as well as the divalent radical (b1) and the hydrogen that is present in each case, is also in each case a further organic radical (b2). These radicals, independently of one another, may be selected arbitrarily per se, provided the amine character is retained. Accordingly, they may be optionally substituted aliphatic, aromatic, or araliphatic radicals or groups. An araliphatic group is a group having both aliphatic and aromatic components. The radicals (b2) are preferably not aromatic, or contain no aromatic components. Especially preferably, therefore, the amines (B) are completely free from any aromatic groups or components.

The radicals (b2) are preferably optionally substituted alkyl groups. An example of an unsubstituted alkyl group is a methyl group or a ethyl group. An example of a substituted alkyl group is an ethyl group in which one hydrogen atom is substituted by a nitrile group. An example is the radical —$CH_2CH_2$—CN. Another example would be an alkyl radical connected via an ester bond to another alkyl radical. An example is the substituted radical —$CH_2CH_2$—C(O)—O—$CH_3$. The optionally substituted alkyl groups contain preferably 2 to 10, more particularly 2 to 4, carbon atoms in alkyl units. For example, the radical —$CH_2CH_2$—CN contains two carbon atoms in alkyl units. The radical —$CH_2CH_2$—C(O)—O—$CH_3$ contains three such carbon atoms, since one carbon atom is present not in an alkyl unit but instead in an ester bond.

In the simple and efficient manner described in yet more detail later on below, the diamines (B) may be prepared through the reaction of primary diamines (containing two primary amino groups and also an aliphatic group (b1) arranged between them) with acrylic acid derivatives, by conventional nucleophilic addition of the amine onto the carbon-carbon double bond of the acrylic group in the acrylic acid derivative. As is known, in order to realize a nucleophilic reaction of this kind, it is necessary to bring about an electron-withdrawing effect of maximum effectiveness on the carbon-carbon double bond. This is accomplished through the use of, in particular, acrylonitrile or acrylic esters, more particularly $C_1$-$C_6$ alkyl esters, preferably methyl acrylate and ethyl acrylate. Especially preferred is acrylonitrile.

If follows from the above that the radicals (b2) are preferably selected from the group consisting of —$CH_2CH_2$—CN and also —$CH_2CH_3$—C(O)—O—$C_nH_{2n+1}$ with n=1 to 6, preferably n=1 to 2. The reason is that it is these radicals (b2) which result when the preferred acrylic acid derivatives are employed for the nucleophilic addition. Especially preferred is the radical —$CH_2CH_2$—CN.

Particularly preferred diamines (B) may therefore be described by the following formula (II):

$$(b2)\text{-NH-}(b1)\text{-NH-}(b2) \qquad (II)$$

where (b1)=aliphatic group having 4 to 30 carbon atoms, especially preferably cycloaliphatic group having 6 to 18 carbon atoms, very preferably aliphatic group of the formula (I),
(b2)=independently at each occurrence, —$CH_2CH_2$—CN and/or —$CH_2CH_2$—C(O)—O—$C_nH_{2n+1}$ with n=1 to 6, preferably —$CH_2CH_2$—CN.

The diamines (B) preferably have an amine number of 300 to 500 mg KOH/g, more particularly of 350 to 450 mg KOH/g (measured by means of DIN EN ISO 15880). Since the diamines (B) are components having exactly two amino groups, the amine number and the molecular weight of the components are dependent on one another, which is to say that the stated amine number provides information on the molecular weight. A high molecular weight would go hand in hand with a fairly low amine number.

The preparation of the diamines (B) may proceed in a conventional way, as for example by nucleophilic addition of two equivalents of acrylic acid derivative onto one equivalent of diamine having two primary amino groups. A preparation of this kind is described in laid-open specification WO 2007/031534 A1, for example.

Preferably, then, the diamine (B) is prepared via the nucleophilic addition of acrylic derivatives onto primary diamines. In this case it is preferably the aforementioned acrylic derivatives which are used, specifically acrylonitrile and/or acrylic esters, more particularly $C_1$-$C_6$ alkyl esters. The primary diamines are preferably selected such that after the reaction, the diamine (B) contains the abovementioned preferred aliphatic groups (b1). Examples of possible amines include the following: isophoronediamine, 3,3'-dimethyl-4,4'-diaminodicyclohexylmethane, 4,4'-diaminodicyclohexylmethane, 4,4'-diaminodiphenylmethane, hexamethylenediamine, and 2-methylpentamethylene-diamine. Preference is therefore given to isophoronediamine, 3,3'-dimethyl-4,4'-diaminodicyclohexylmethane, 4,4'-diaminodicyclohexylmethane, hexamethylenediamine, and 2-methylpentamethylendiamine. Especially preferred are the stated cycloaliphatic primary diamines, more particularly isophoronediamine. This primary diamine evidently includes the especially preferred radical (b1) of the formula (I).

The fraction of the diamines (B) is preferably in the range from 0.7 to 9.0 wt %, more preferably 1.0 to 7.0 wt %, very preferably 1.4 to 5.0 wt %, based in each case on the total weight of the coating composition of the invention.

The two-component coating composition comprises, specifically in the hardener component (2), at least one polyisocyanate-modified polyester (C) having an isocyanate content of 4% to 15%.

Polyesters are known. They are polymeric resins prepared by reaction of polyhydric organic polyols and polybasic organic carboxylic acids. These polyols and polycarboxylic acids are linked with one another by esterification, in other words by condensation reactions. Depending on the nature, functionality, and fractions and proportions used of the starting components, the products obtained are, for example, linear or branched. Whereas linear products come about primarily when using difunctional starting components (diols, dicarboxylic acids), the use of alcohols of higher functionality (OH functionality, in other words the number of OH groups per molecule, of more than 2) produces branching, for example. During the preparation process the proportional use of monofunctional components is of course also possible, such as of monocarboxylic acids, for example. It is known that for preparing polyesters it is also possible, instead of or together with the corresponding organic carboxylic acids, to employ the anhydrides of the carboxylic acids, more particularly the anhydrides of dicarboxylic acids. Likewise possible is preparation through the use of hydroxycarboxylic acids or of the lactones that derive from the hydroxycarboxylic acids by intramolecular esterification.

The polyester to be modified is preferably a polylactone polymer, in other words a polymer prepared generally by ring-opening polymerization of lactones such as, in particular, epsilon-caprolactone. Here, organic alcohols, usually diols, are generally employed as starters or catalysts. In that case, when diols are used, the resulting polylactone polymer possesses two terminal hydroxyl groups. At any rate, however, the polymer possesses a hydroxyl group, which comes about as a result of the last ring opening. Such polyesters are therefore linear-aliphatic and saturated polyesters having at least one hydroxyl group. Suitable lactones for preparing the polylactone polymer are beta-propiolactone, gamma-butyrolactone, gamma-valero-lactone, epsilon-caprolactone, or methyl-epsilon-caprolactone, preferably gamma-butyrolactone and epsilon-caprolactone, more preferably epsilon-caprolactone. Suitable starter alcohols are neopentyl glycol, ethylene glycol, or trimethylolpropane.

With preference, accordingly, the polyester for modification is a linear-aliphatic, hydroxyl-containing polyester, more preferably a saturated polyester. The polyester for modification is very preferably a polycaprolactone polymer.

The polyester, more particularly the linear-aliphatic and saturated polyester with at least one hydroxyl group, more preferably the polycaprolactone polymer, is polyisocyanate-modified and has an isocyanate content of 4% to 15%.

This means that the polyester for modification as described above is modified with a polyisocyanate, meaning that it is reacted with formation of covalent bonds, but with free isocyanate groups remaining over it at any rate after the reaction. Especially preferably a diisocyanate is used for the modification. Evidently, therefore, the polyester must contain functional groups reactive with isocyanate groups, such as hydroxyl groups or amino groups, for example. From the above it follows that they are preferably hydroxyl groups. In this case, after the reaction, the polyisocyanate is then linked to the polyester via a urethane group. The corresponding reactions and reaction conditions are known in principle.

As polyisocyanates for the modification it is possible to use the conventional compounds such as aliphatic and aromatic polyisocyanates, more particularly diisocyanates, and their dimers and trimers such as uretdiones and isocyanurates. Reference may be, by way of example, to hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis(isocyanato-methyl)cyclohexane, 1,4- or 1,3- or 1,2-diisocyanato-cyclohexane, and 2,4- or 2,6-diisocyanato-1-methylcyclohexane, diisocyanates or mixtures of these polyisocyanates, and also the conventional dimers and/or trimers of the stated polyisocyanates, in other words, for example, uretdiones and isocyanurates of the abovementioned polyisocyanates. Preference is given to using aliphatic polyisocyanates, more particularly aliphatic diisocyanates. Especially preferred is for no aromatic polyisocyanates to be used. One particularly preferred polyisocyanate is hexamethylene diisocyanate (HDI).

The polyisocyanate-modified polyester possesses an isocyanate content of 4% to 15%, preferably 5% to 12%, especially preferably 6% to 10%. In the context of the present invention, the isocyanate content is determined in accordance with DIN EN ISO 11909 by reaction of the respective sample with excess dibutylamine and back-titration of the excess with hydrochloric acid against bromophenol blue.

The weight-average molecular weight of the component (C) lies, for example, within the range of 500 to 10 000 g/mol such as, in particular, 1000 to 4000 g/mol.

Corresponding products are available commercially, in solvent-free form or as a solution in conventional solvents as described later on below, for example, and they can readily be used in the hardener component of the coating composition of the invention. Reference may be made, for example, to products with the trade name Tolonate™ (Vencorex), Desmodur® (Bayer) or Adiprene® (Chemtura).

The fraction of the at least one polyisocyanate-modified polyester (C) is preferably in the range from 8 to 90 wt %, more preferably 12 to 80 wt %, very preferably 16 to 70 wt %, based in each case on the total weight of the coating composition of the invention.

As further constituents, the coating composition of the invention may comprise any of a wide variety of coatings components that are known to the person skilled in the art.

It is preferred, however, for components (A), (B), and (C) overall to account for a fraction of at least 50 wt %, especially preferably at least 60 wt %, based on the total weight of the coating composition.

The coating composition may comprise organic solvents and/or water. Organic solvents are aliphatic and/or aromatic hydrocarbons such as toluene, xylene, solvent naphtha, Solvesso 100, or Hydrosole® (from ARAL), ketones, such as acetone, methyl ethyl ketone or methyl amyl ketone, esters, such as ethyl acetate, butyl acetate, butyl glycol acetate, pentyl acetate, methoxypropyl acetate or ethyl ethoxypropionate, ethers, alcohols, chlorinated hydrocarbons, or mixtures of the aforementioned solvents.

It is of particular advantage, however, that the coating material of the invention can be produced in solvent-free form. The components otherwise included permit application to a substrate, as described below, despite the absence of any solvent. In this way, more particularly by avoidance of organic solvents, the coating composition also has a high environmental profile. The expression "solvent-free" is known fundamentally to the skilled person. It is used preferably to mean that the coating composition contains less than 10 wt % of organic solvents. Preferably there are less than 7.5 wt % of organic solvents, especially preferably less than 5 wt % of organic solvents, very preferably less than 2.5 wt % of organic solvents. The figures are based in each case on the total weight of the coating composition. Organic solvents, therefore, are preferably not explicitly added in order, for example, to adapt the viscosity of the composition. They are used, if at all, only in small amounts in the coating composition as a result of the use of—for example—typical coatings additives, which may be optionally obtained commercially in solution in organic solvents. The coating composition also preferably contains no water or only minor amounts of water (water-free). Especially preferably there is less than 1.0 wt %, preferably less than 0.2 wt %, still more preferably less than 0.01 wt %, of water present, based on the total weight of the coating composition. It is therefore preferably used in the composition only, if at all, as a result of the use of—for example—typical coatings additives.

Besides the at least one polyisocyanate-modified polyester (C) having an isocyanate content of 4% to 15%, the coating composition of the invention may further comprise at least one additional component comprising polyisocyanate groups different from (C). It is nevertheless preferable for the component (C) to be used in a fraction of at least 30 wt %, especially preferably at least 35 wt %, based on the total amount of the components comprising polyisocyanate groups present in the coating composition.

Further components comprising polyisocyanate groups which can be used are the polyisocyanates that are known per se, such as aliphatic and aromatic polyisocyanates, more particularly diisocyanates and their dimers and trimers such as uretdiones and isocyanurates. Examples that may be referenced include hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate (IPDI), 2-isocyanatopropylcyclohexyl isocyanate, dicyclohexylmethane 2,4'-diisocyanate, dicyclohexylmethane 4,4'-diisocyanate, 1,4- or 1,3-bis (isocyanatomethyl)-cyclohexane, 1,4- or 1,3- or 1,2-diisocyanato-cyclohexane, and 2,4- or 2,6-diisocyanato-1-methylcyclohexane or mixtures of these polyisocyanates. Preference here is given to using the dimers and/or trimers of the stated polyisocyanates that are known per se—in other words, thus, in particular, the uretdiones and isocyanurates of the abovementioned polyisocyanates, that are known per se and also available commercially. Preference is given to using aliphatic polyisocyanates. More particular preference is given to using aliphatic polyisocyanates. Preferred further polyisocyanates are hexamethylene diisocyanate and isophorone diisocyanate and also mixtures thereof, more particularly their various trimers and dimers, such as isocyanurates and uretdiones. The isocyanate groups in these components may be free or may be blocked by known blocking agents. The isocyanate groups are preferably unblocked (i.e., free). This is also the case for the above-described component (C) essential to the invention. The coating composition accordingly comprises preferably exclusively components which comprise polyisocyanate groups and which are unblocked, these components being used preferably exclusively in the hardener component. The stated polyisocyanates are available commercially. Where present, the further polyisocyanates are, of course, preferably used in the hardener component. A compound is termed a polyisocyanate when it contains on average more than one isocyanate group per molecule.

The coating composition of the invention may comprise a molecular sieve or a plurality of molecular sieves. Molecular sieve is the designation for natural or synthetic zeolites. As is known, they have a comparatively high internal surface area (about 600 to 700 $m^2/g$) and uniform pore diameters. The result of this is a relatively high adsorbency. The coating composition contains preferably 1 to 10 wt %, based on the total weight of the composition, of at least one molecular sieve. Suitable molecular sieves have a pore size of 2 to 10, preferably 3 to 4 angstroms. For example, high-porosity aluminum silicates with a pore size of 3 angstroms may be used.

The coating composition of the invention may comprise catalysts for the catalysis of the reaction of hydroxyl groups and amino groups with isocyanate groups. Based on the total weight of the composition, the coating composition comprises preferably 0.01 to 2 wt % of at least one catalyst. More preferably the coating composition of the invention comprises 0.02 to 1 wt %, based in each case on the total weight of the composition, of at least one catalyst. Suitable catalysts are the known metal catalysts such as, for example, tin, molybdenum, zirconium, or zinc catalysts, and also aminic catalysts such as 2-(2-dimethylaminoethoxy)ethanol, for example. Particularly suitable catalysts are tin compounds such as dimethyltin dilaurate or dibutyltin dilaurate, which, like all above-stated catalysts, catalyze a reaction between the isocyanurate group-containing compounds (C) and the hydroxyl- and amino-containing components (A) and (B).

Lastly, the coating material compositions of the invention may also further comprise other constituents different from the components already described. These constituents include, for example, typical coatings additives such as antioxidants, deaerating agents, wetting agents, dispersants, flow control agents, and defoamers, as for example polysiloxane-based defoamers, adhesion promoters, as for example silane-based adhesion promoters, rheological assistants such as thickeners, antisag agents, and thixotropic agents, waxes and wax-like compounds, biocides, matting agents, radical scavengers, light stabilizers, preferably UV absorbers with an absorption maximum below 370 nm and/or sterically hindered amines (HALS), corrosion inhibitors, flame retardants, or polymerization inhibitors, and also soluble dyes, pigments, and further fillers or catalysts. The fraction of such constituents is within the ranges common for them, of 0.1 to 20 wt %, for example, based on the total amount of the coating composition.

The solids content of the coating compositions may vary according to the requirements of the case in hand, although it is especially advantageous that the composition can be prepared in solvent-free and water-free form and can nevertheless be applied in the manner described below. Preferably, therefore, the solids content of the coating composition of the invention is greater than 80%, more preferably greater than 85%, and very preferably 90 to 98 wt %.

By solids content (nonvolatile fraction) is meant that weight fraction which is left as a residue on evaporation under specified conditions. In the present application, the solids are determined according to DIN EN ISO 3251. This is done by evaporating the composition at 130° C. for 60 minutes.

Unless otherwise indicated, this test method may likewise be employed in order to specify or obtain a preliminary determination of, for example, the fraction of various components or constituents of the coating composition, such as a polycarbonate diol, for example, as a proportion of the total weight of the composition. It is possible, therefore, to determine the solids of a dispersion of a component that is to be added to the composition. By taking account of the solids of the dispersion and the amount of the dispersion used in the composition, it is then possible to determine or specify the fraction of the component as a proportion of the overall composition. This determination method may of course also take place if, for example, a constituent has been acquired commercially and is identified by the seller as being solvent-free or water-free. In this case, the solids of the commercial product for use will amount, for example, to approximately 100%.

In one preferred embodiment, the coating composition of the invention comprises
  (1) in the paint base component
  (A) 20.0 to 50.0 wt % of at least one polycarbonate diol,
  (B) 1.0 to 7.0 wt % of at least one diamine comprising secondary amino groups and having an aliphatic group (b1) between the nitrogen atoms of the amino groups, and also
  (2) in the hardener component
  (C) 16 to 70 wt % of at least one polyisocyanate-modified polyester having an isocyanate content of 4% to 15%, the weight figures being based in each case on the total weight of the coating composition.

Within this preferred embodiment, of course, all variants that are advantageous and have been described earlier on above, in terms of the components (A) to (C), for example, may likewise be considered to be advantageous. This applies in respect of the combination of the preferred embodiment with only one or else two or more of the above-described advantageous variants.

The ratio of the total molar amount of hydroxyl groups and amino groups in the paint base component to the molar amount of isocyanate groups in the hardener component is preferably from 1.0/0.9 to 1.0/1.5. With particular preference, accordingly, the ratio of the total molar amount of hydroxyl groups in component (A) and amino groups in component (B) of the paint base component to the molar amount of isocyanate groups in the hardener component occupies the stated value.

Of the stated constituents (A), (B) and (C) there is preferably precisely one of each constituent present in the coating composition.

All stated preferred embodiments are taken per se and may be considered as preferred in combination with all other preferred configurations. The preferred embodiments apply not only for the coating composition of the invention, but also for the subject matter described subsequently, as for example a process in which the coating composition is employed.

In the case of a possible particularization to coating compositions comprising preferred components, for example preferred diamines (B), the following applies in a specific fractional range. The diamines (B) which do not fall within the preferred group may of course also be present in the coating composition. The specific fractional range then applies only to the preferred group of diamines. It is nevertheless preferred for the specific fractional range to apply likewise to the total fraction of diamines, consisting of diamines from the preferred group and diamines (B) which do not fall within the preferred group.

If, therefore, there were to be restriction to a fractional range of 1.0 to 7.0 wt % and to a preferred group of diamines, then this fractional range evidently applies initially only to the preferred group of diamines. In that case, however, it would be preferable for there to be likewise from 1.0 to 7.0 wt % present overall of all originally encompassed diamines (B), consisting of diamines from the preferred group and diamines (B) which do not fall within the preferred group. If, therefore, 5.0 wt % of diamines of the preferred group are employed, then not more than 2.0 wt % of the diamines (B) of the non-preferred group may be employed.

In the context of the present invention, the stated principle applies to all stated components of the coating composition and to their fractional ranges.

The present invention also relates to a method for producing the coating composition of the invention. It can be produced using the customary and known mixing methods and mixing assemblies such as stirred tanks, agitator mills, extruders, or compounders. In this context it should be borne in mind that the coating composition of the invention is a two-component composition and that the paint base component and the hardener component are prepared and stored separately from one another and then not combined and mixed until shortly before the application of the coating composition, as described above. Besides the constituents (A) and (B) that are essential to the invention, this paint base component generally comprises any adjuvants and/or coatings additives that may be present. This paint base component is then admixed with the hardener component, which in addition to the constituent (C) that is essential to the invention may also comprise further polyisocyanates, shortly before the coating composition is applied to a substrate.

A further subject of the present invention relates to a coating produced from the coating composition of the invention, and also to a method for producing such coatings.

The method for producing a coating comprises the application of the coating composition to a substrate. Application may take place by the customary methods such as spraying (for example, airless, air mix, compressed air, hot spray methods or inductive mixing), roller coating, rolling, brushing, pouring or by cartridge. The coating composition is preferably applied by brushing or spraying.

In order to produce a cured coating, the applied coating composition is cured following application. Curing preferably takes place thermally. In this case the applied coating composition or the coating consisting of the composition is exposed preferably to temperatures of not more than 80° C., preferably not more than 60° C. Particularly preferred is a temperature range from 15 to 60° C., very particularly from 15 to 50° C.

The period of time needed for complete curing may vary greatly according to the curing temperature selected, and is situated, for example, in the range from 30 minutes to 10 days. Curing may take place, for example, for a time of 30 minutes at 40° C. to 60° C., or else at only 15 to 25° C. for a time of 7 days.

In the course of or prior to the curing, it is also possible to employ customary thermal curing devices and/or convection methods, examples being tunnel ovens, IR and NIR heat radiators, fans, and blowing tunnels. These devices may also be combined with one another. In that case, a temperature-controlled curing procedure may be assisted by convection.

The coatings may in each case have a dry film thickness of, for example, 100 to 500 μm, preferably from 150 to 400 μm.

The coatings of the invention can be produced on any desired substrates by application to the substrate of a coating composition of the invention. The substrates may be composed of any of a very wide variety of materials and combinations of materials. They consist preferably of metals such as steel or aluminum and also of plastics such as epoxy resin-based plastics, which may have been given glass fiber (GRP), aramid fiber (ARP) and/or carbon fiber (CRP) reinforcement or a natural fiber reinforcement with hemp or sisal, for example, and/or of glass. Preferred substrates are glass fiber-reinforced epoxy resin plastics. The substrates may have any desired shapes and sizes.

An advantage, however, is that very large substrates in particular, such as rotor blades, for example, can be coated without particular technical difficulties. The reason is that the coating composition of the invention can be cured at room temperature (i.e., 15 to 25° C.), meaning that there is no need for explicit supply of heat, in other words thermal energy, as part of a complex equipment set-up, in order to produce a cured coating. Ultimately, therefore, from a coating produced initially by the application of the coating composition, a cured coating is obtained by simple storage at room temperature.

On account of the very good erosion resistance of the coatings, preferred substrates are those which are particularly subject to rain or sand erosion. Substrates contemplated may be rotor blades, air or land vehicles, ships, edifices, or pipelines. Preferred substrates are rotor blades of wind turbines, helicopters, or ship's screws, and also air vehicles such as airplanes, for example. Suitable substrates more particularly are rotor blades of wind turbines and airplanes.

It follows from the above that a substrate coated with a coating of the invention is also provided by the present invention. It follows equally from the above that the use of the coating composition of the invention and also the use of a coating of the invention for improving the erosion resistance of substrates, more particularly of the substrates specified above, are also provided by the present invention.

It is also possible for a multicoat coating to be produced using a coating composition of the invention. A multicoat coating of this kind is also provided by the present invention. The coating produced from the coating composition is therefore present in a multicoat coating. Preferred multicoat coatings are those in which a coating of the invention constitutes the topcoat. In this way, one technical effect of the coating of the invention, namely the outstanding erosion resistance, is exploited to its optimum. This means that all of the further coating layers are disposed beneath the coating of the invention, and hence between the substrate and the coating of the invention. A substrate coated with a coating of the invention need not, therefore, be in direct contact with this coating. Disposed in between there may be further coats, an example being at least one surfacer coat known per se.

The coating composition of the invention is especially suitable for the coating of corners and edges, more particularly edges, of substrates. The use of the coating composition of the invention and also the use of a coating of the invention for improving edge protection is therefore also provided by the present invention. Straight edges of substrates, as for example of the substrates identified above, are particularly severely subject to erosive effects in service.

The present invention is elucidated below by examples.

EXAMPLES

1. Test Methods
1.1 General Remarks

For the laboratory determination of erosion resistance it is in general possible to use a variety of equipment, with which either the coated substrate for erosion is moved through the erosion medium, or the substrate is fixed and the erosion medium flows around it. A stationary test specimen can be tested, for example, by a high-pressure water jet technique, which is used for water jet cutting, for example. The erosion effect is controlled by water pressure, by distance from the workpiece, and by the type and size of nozzles. The effect can be intensified further by the use of sand, corundum or silicon carbide at the same time. Also conceivable is sandblasting or steam blasting, in which case the prevailing pressure, nozzle size, and distance from the workpiece may likewise be used to vary the erosion effect and adapt it to realistic conditions.

In the case of the rain erosion test for moving test specimens, the coated substrate for erosion is attached to a rotor or a disk and is moved, by means of the radial velocity generated, through a curtain of water droplets or mixtures with salt or sand. Currently the most common test scenario, which is used in the wind energy sector, for example, operates with velocities of 140 m/s and a rain volume of 30 l/h. In the airplane industry, velocities of up to 220 m/s are tested, with a comparable rain volume. The tests for rain erosion resistance may take place in accordance with the standard specification ASTM G 73. The constructions covered by this specification are individual and can be compared with one another using standards.

Common to the stated testing possibilities is the simulation of realistic velocities, such as peripheral velocities of rotor blades or travel flight velocities of airplanes, with the damage patterns being similar to the damage patterns that occur realistically.

1.2 Test Conditions

As part of the examples, the rain erosion resistance was tested in accordance with the standard specification ASTM G 73. The tests were carried out on an in-house rain erosion test set-up. The test specimens are spun at defined time intervals (15 minutes) and at defined velocity (140 m/s) through a curtain of droplets. The flow rate applied keeps the rain volume likewise constant (30 l/h). The droplet sizes of the applied "rain" are on average 5-6 mm. The tests take place at a temperature of 20 to 25° C. Evaluation is visual. The erosion resistance corresponds to the time taken for the substrate to first show through.

2. Production of Coating Compositions and Cured Coatings

The paint base components and hardener components of various coating compositions (I=inventive, C=comparative) were prepared by combining the respective constituents and homogeneously mixing them in a dissolver (table 1).

TABLE 1

| Constituent | Parts by weight | | |
|---|---|---|---|
| | I1 | I2 | C1 |
| Paint base component | | | |
| Linear aliphatic polycarbonate diol (A) having terminal hydroxyl groups, solvent-free, OH number = 225 | | 77.0 | |
| Linear aliphatic polycarbonate diol (A) having terminal hydroxyl groups, solvent-free, OH number = 172 | 82.0 | | |
| Diamine (B) [1] (amine number = 415) | 7.2 | 6.0 | |
| Mixture of polyester polyols | | | 58.5 |
| Additive mixture | 4.0 | 8.0 | 1.2 |
| Molecular sieve | 3.0 | 4.0 | 3.5 |
| Color pigment | 3.8 | 5.0 | 5.8 |
| Filler | | | 31.0 |
| Total | 100 | 100 | 100 |
| Hardener component | | | |
| Aliphatic, HDI-modified polyester (C) with an isocyanate content of 8.4% | 38.8 | 180 | |
| Mixture of HDI- and IPDI-based polyisocyanates (isocyanate content 21%) | 58.2 | | |
| HDI-based polyisocyanate (isocyanate content 21.8%) | | | 74.0 |
| Total | 97 | 180 | 74 |

[1] Adduct of one equivalent of isophoronediamine and 2 equivalents of acrylonitrile.

The respective paint base components were then mixed homogeneously with the respective hardener components in the proportions stated in the table and this mixture was applied directly (brush application) to an epoxy resin test specimen already coated with a commercial, polyurea-based pore filler. Curing took place by storage over a period of 7 days at 20 to 25° C. The dry film thickness was 300 micrometers.

As an additional comparative composition and comparative multicoat coating, example 2 of WO 2012/032113 was recruited (C2).

The multicoat coatings disposed on the substrate were subsequently investigated for rain erosion resistance (table 2).

TABLE 2

| | I1 | I2 | C1 | C2 |
|---|---|---|---|---|
| Rain erosion test duration | 900 minutes | 1000 minutes | 60 minutes | 160 minutes |

It is evident that the multicoat coatings disposed on the substrate and comprising as their topcoat a coating of the invention exhibit a very good erosion resistance. The resistance, moreover, is significantly better than in the case of multicoat coating systems produced without use of a coating composition of the invention.

The invention claimed is:

1. A two-component coating composition, comprising:
   (1) a paint base component, comprising:
      (A) at least one aliphatic and linear polycarbonate diol having an OH number of 100 to 500 mg KOH/g,
      (B) at least one diamine comprising secondary amino groups and having an aliphatic group (b1) between the nitrogen atoms of the amino groups, and
   (2) a hardener component, comprising:
      (C) at least one polyisocyanate-modified polyester having an isocyanate content of 4% to 15%,
   wherein the two-component coating composition does not comprise a wax, a wax-like compound, or both.

2. The two-component coating composition as claimed in claim 1, wherein said at least one aliphatic and linear polycarbonate diol (A) has an OH number of 150 to 400 mg KOH/g.

3. The two-component coating composition as claimed in claim 1, wherein said at least one diamine (B) has an amine number of 300 to 500 mg KOH/g.

4. The two-component coating composition as claimed in claim 1, wherein the aliphatic group (b1) of the diamine (B) is cycloaliphatic.

5. The two-component coating composition as claimed in claim 1, wherein the diamine (B) has the following formula (II):

$$\text{(b2)-NH-(b1)-NH-(b2)} \qquad (II)$$

where (b1)=aliphatic group having 4 to 30 carbon atoms,
(b2)=independently at each occurrence, $-CH_2CH_2-CN$ and/or $-CH_2CH_2-C(O)-O-C_nH_{2n+1}$ with n=1 to 6.

6. The two-component coating composition as claimed in claim 1, wherein the polyisocyanate-modified polyester (C) is a hexamethylene diisocyanate-modified polyester.

7. The two-component coating composition as claimed in claim 1, wherein the modified polyester (C) is prepared by reacting hexamethylene diisocyanate with a hydroxy-functional aliphatic polyester.

8. The two-component coating composition as claimed in claim 7, wherein the hydroxy-functional aliphatic polyester used for the reaction is a polycaprolactone polymer.

9. A method for producing a coating on a substrate, comprising:
   applying a coating composition as claimed in claim 1 to a substrate to produce a coating on said substrate.

10. The method as claimed in claim 9, further comprising:
    curing the coating present on said substrate at a temperature of not more than 80° C.

11. A coating produced by a method as claimed in claim 1.

12. A multicoat coating which comprises as topcoat a coating as claimed in claim 11.

13. A substrate coated with a coating as claimed in claim 11.

14. A substrate coated with a multicoat coating as claimed in claim 12.

15. The two-component coating composition as claimed in claim 1, wherein
the paint base component consists of
(A) one polycarbonate diol,
(B) one diamine comprising secondary amino groups and having an aliphatic group (b1) between the nitrogen atoms of the amino groups, and
the hardener component consists of (C) one polyisocyanate-modified polyester having an isocyanate content of 4% to 15%.

16. The two-component coating composition as claimed in claim 1, wherein the at least one aliphatic and linear polycarbonate diol is prepared with a diol selected from the group consisting of 3-methyl-1,5-pentanediol and 1,6-hexanediol.

17. The two-component coating composition as claimed in claim 1, wherein the at least one aliphatic and linear polycarbonate diol is a linear alkyl polycarbonate diol.

* * * * *

UNITED STATES PATENT AND TRADEMARK OFFICE
CERTIFICATE OF CORRECTION

PATENT NO. : 10,519,340 B2
APPLICATION NO. : 15/322601
DATED : December 31, 2019
INVENTOR(S) : Dieter Hohnholz et al.

Page 1 of 1

It is certified that error appears in the above-identified patent and that said Letters Patent is hereby corrected as shown below:

On the Title Page

In Column 2, item (56), Other Publications, Line 4, delete "MaterialScience;" and insert -- Material Science; --.

In the Specification

In Column 4, Line 47, delete "Kasei)," and insert -- Kasei, --.

In Column 4, Line 48, delete "MaterialScience" and insert -- Material Science --.

In Column 9, Line 31, delete "Hydrosole®" and insert -- Hydrosol® --.

In Column 10, Line 50, delete "adsorbency." and insert -- absorbency. --.

Signed and Sealed this
Twelfth Day of May, 2020

Andrei Iancu
*Director of the United States Patent and Trademark Office*